United States Patent [19]

Matsuura et al.

[11] 4,330,639

[45] May 18, 1982

[54] POLYMER BLEND COMPOSITION FOR FORMING POLYETHYLENE FILM

[75] Inventors: Kazuo Matsuura, Kawasaki; Noboru Yamaoka; Shinichi Yanahashi, both of Yokohama; Mituji Miyoshi, Kanagawa, all of Japan

[73] Assignee: Nippon Oil Company, Ltd., Tokyo, Japan

[21] Appl. No.: 218,620

[22] Filed: Dec. 22, 1980

[30] Foreign Application Priority Data

Dec. 26, 1979 [JP] Japan .................................. 54-168177

[51] Int. Cl.$^3$ ........................ C08L 23/08; C08L 23/06
[52] U.S. Cl. .................................................... 525/240
[58] Field of Search .......................................... 525/240

[56] References Cited

U.S. PATENT DOCUMENTS

| | | | |
|---|---|---|---|
| 3,176,051 | 3/1965 | Gregorian et al. | 525/240 |
| 3,179,719 | 4/1965 | Cines | 525/240 |
| 3,250,825 | 5/1966 | Martinovich | 525/240 |
| 3,280,220 | 10/1966 | Nelson | 525/240 |
| 3,998,914 | 12/1976 | Lillis et al. | 525/240 |

*Primary Examiner*—Carman J. Seccuro
*Attorney, Agent, or Firm*—Wyatt, Gerber, Shoup, Scobey & Badie

[57] ABSTRACT

Provided is a polymer composition for forming polyethylene film comprising an ethylene/$C_3$-$C_8$ α-olefin copolymer having an intrinsic viscosity of 1.3 to 8.7 dl/g determined in decalin at 135° C. and a density of 0.850 to 0.930 and an ethylene polymer having a melt index of 0.01 to 0.2, a flow parameter of 1.9 to 2.8 and a density not lower than 0.940.

4 Claims, No Drawings

POLYMER BLEND COMPOSITION FOR FORMING POLYETHYLENE FILM

BACKGROUND OF THE INVENTION

This invention relates to a polymer composition for forming polyethylene film.

Ethylene polymers having a melt index of 0.01 to 0.2 and a density now lower than 0.940 have heretofore been known as raw materials for forming films of high strength.

However, in the case of forming such polymers into a film by extrusion molding, e.g. inflation molding, there actually is a limit to thinning the film since the film as a commodity is required to have a strength higher than a certain level. If it is possible to make the film strength higher, a thinner film can be used for the same purpose as before, so that not only the productivity of film for unit weight of ethylene polymer is improved, but also a great merit is obtained from the economic point of view.

SUMMARY OF THE INVENTION

It is an object of this invention to provide a polymer composition for forming a polyethylene film having a higher strength.

Other objects and advantages of this invention will become apparent from the following description.

The aforesaid objects of this invention can be attained by a polymer composition comprising a blend of an ethylene polymer having a melt index of 0.01 to 0.2, a flow parameter of 1.9 to 2.8 and a density not lower than 0.940 and an ethylene/α-olefin copolymer having an intrinsic viscosity of 1.3 to 8.7 dl/g measured in decalin at 135° C. and a density of 0.850 to 0.930, said ethylene/α-olefin copolymer being prepared by copolymerizing ethylene and an α-olefin of $C_3$ to $C_8$ in a substantially solvent-free vapor phase condition and in the presence of a catalyst, said catalyst comprising a solid substance and an organoaluminum compound, which solid substance contains a magnesium-containing inorganic solid compound and a titanium compound and/or a vanadium compound. If the above polymer composition is formed into a film by extrusion molding, the strength of the film can be improved to a remarkable extent without affecting at all the film forming property.

DETAILED DESCRIPTION OF THE INVENTION

The copolymer of ethylene and a $C_3$ to $C_8$ α-olefin used in this invention has an intrinsic viscosity measured in decalin at 135° C. of 1.3 to 8.7 dl/g, preferably 1.9 to 7.1 dl/g and more preferably 2.3 to 6.1 dl/g, and a density of 0.850 to 0.930, preferably 0.860 to 0.920 and more preferably 0.870 to 0.910. Intrinsic viscosities smaller than 1.3 dl/g or densities lower than 0.850 are not desirable because they would result in the film strength or stiffness becoming lower. If the intrinsic viscosity is larger than 8.7 dl/g or the density higher than 0.930, there is fear that the film forming property will be deteriorated or gel produced.

In the polymer composition of this invention, the blending ratio (wt.%) between component (1) which is an ethylene/$C_3$-$C_8$ α-olefin copolymer having an intrinsic viscosity of 1.3 to 8.7 dl/g measured in decalin at 135° C. and a density of 0.850 to 0.930 and component (2) which is an ethylene polymer having a melt index of 0.01 to 0.2, a flow parameter of 1.9 to 2.8 and a density not lower than 0.940, is 0.1 to 40:99.9 to 60, preferably 1 to 30:99 to 70 and more preferably 3 to 20:97 to 80, in terms of component (1):component (2). Blending ratio of the component (1) smaller than 0.1 wt.% and that larger than 40 wt.% both are not desirable because in the former case the film strength will not be improved so much, while in the latter case the forming property will be deteriorated.

The ethylene/α-olefin copolymer having an intrinsic viscosity of 1.3 to 8.7 dl/g measured in decalin at 135° C. and a density of 0.850 to 0.930 used as one component of the composition of this invention is prepared by copolymerizing ethylene and an α-olefin of $C_3$ to $C_8$ in a substantially solvent-free vapor phase condition and in the presence of a catalyst, said catalyst comprising a solid substance and an organoaluminum compound, which solid substance contains a magnesium-containing inorganic solid compound and a titanium compound and/or a vanadium compound.

The catalyst system used in this invention combines a solid substance with an organoaluminum compound which solid substance contains a magnesium-containing inorganic solid carrier and a titanium compound and/or a vanadium compound. As the magnesium-containing inorganic solid carrier are mentioned, for example, metallic magnesium, magnesium hydroxide, magnesium carbonate, magnesium oxide, magnesium chloride, further double salts, double oxides, carbonates, chlorides and hydroxides, which contain magnesium atom and a metal selected from silicon, aluminum and calcium, and still further these inorganic solid compounds after treatment or reaction with an oxygen-containing compound, a sulfur-containing compound, an aromatic hydrocarbon or a halogen-containing substance. And to the inorganic solid carrier exemplified above is attached a titanium compound and/or a vanadium compound in known manner.

As the above mentioned oxygen-containing compound are exemplified water; organic oxygen-containing compounds such as alcohols, phenols, ketones, aldehydes, carboxylic acids, esters, and acid amides; and inorganic oxygen-containing compounds such as metal alkoxides and metal oxyhalides. As the sulfur-containing compound are exemplified organic sulfur-containing compounds such as thiol and thioethers; and inorganic sulfur-containing compounds such as sulfur dioxide, sulfur trioxide and sulfuric acid. As the aromatic hydrocarbon are exemplified mono- and poly-cyclic aromatic hydrocarbons such as benzene, toluene, xylenes, anthracene, and phenanthrene. As the halogen-containing substance are exemplified compounds such as chlorine, hydrogen chloride, metal halides and organic halides.

By way of illustrating the titanium compound and/or vanadium compound, mention may be made of halides, alkoxyhalides and halogenated oxides of titanium and/or vanadium. Preferred titanium compounds are of the general formula $Ti(OR)_nX_{4-n}$ wherein R is alkyl, aryl or aralkyl having 1 to 24 carbon atoms and n is $0 \leq n \leq 4$, and also trivalent titanium compounds obtained by reducing these tetravalent titanium compounds with for example hydrogen, titanium, aluminum or an organometallic compound of a Group I-III metal in the Periodic Table. Examples of titanium compounds and vanadium compound are tetravalent titanium tetraiodide, monoethoxytrichlorotitanium, diethoxydichlorotitanium, triethoxymonochlorotitanium, tetraethoxytitanium, monoisopropoxytrichlorotitanium, diisopropoxydichlorotitanium and tetraisopropoxytitanium; various titanium trihalides obtained by reducing titanium tetrahalides with hydrogen, aluminum, titanium or an organometallic compound; trivalent titanium compounds such as compounds obtained by reducing various tetravalent alkoxytitanium halides with an organometallic compound; tetravalent vanadium compounds such as vanadium tetrachloride; pentavalent vanadium compounds such as vanadium oxytrichloride and orthoalkyl vanadate; and trivalent vanadium compounds such as vanadium trichloride and vanadium triethoxide.

Tetravalent titanium compounds are particularly preferred among the above-enumerated titanium compounds and vanadium compounds.

The catalyst used in the invention comprises the combination of a solid substance which contains the foregoing solid carrier and a titanium compound and/or a vanadium compound, with an organoaluminum compound.

Examples of such catalyst are combinations of organoaluminum compounds and the following solid substances (in the following formulae R represents an organic radical and X represents a halogen atom): MgO-RX-TiCl$_4$ system (see Japanese Patent Publication No. 3514/1976), Mg-SiCl$_4$-ROH-TiCl$_4$ system (see Japanese Patent Publication No. 23864/1975), MgCl$_2$-Al(OR)$_3$-TiCl$_4$ system (see Japanese Patent Publications Nos. 152/1976 and 15111/1977), MgCl$_2$-SiCl$_4$-ROH-TiCl$_4$ system (see Japanese Patent Laying Open Print No. 106581/1974), Mg(OOCR)$_2$-Al(OR)$_3$-TiCl$_4$ system (see Japanese Patent Publication No. 11710/1977), Mg-POCl$_3$-TiCl$_4$ system (see Japanese Patent Publication No. 153/1976) and MgCl$_2$-AlOCl-TiCl$_4$ system (see Japanese Patent Publication No. 15316/1979).

In these catalyst systems, a titanium compound and/or a vanadium compound may be used as an adduct with an organocarboxylic acid ester, and the foregoing magnesium-containing inorganic solid carrier may be used after contact with an organocarboxylic acid ester. Also, using an organoaluminum compound as an adduct with an organocarboxylic acid ester causes no trouble. Further, in all possible cases in this invention, a catalyst system prepared in the presence of an organocarboxylic acid ester may be used without causing any trouble.

As the organocarboxylic acid ester there may be used esters of various aliphatic, alicyclic and aromatic carboxylic acids, preferably aromatic carboxylic acids of C$_7$ to C$_{12}$, for example, alkyl esters such as methyl and ethyl of benzoic acid, anisic acid and toluic acid.

Examples of the organoaluminum compound used in this invention are those represented by the general formulae R$_3$Al, R$_2$AlX, RAlX$_2$, R$_2$AlOR, RAl(OR)X and R$_3$Al$_2$X$_3$ wherein R, which may be alike or different, is C$_1$ to C$_{20}$ alkyl or aryl and X is halogen, such as triethylaluminum, triisobutylaluminum, trihexylaluminum, trioctylaluminum, diethylaluminum chloride, ethylaluminum sesquichloride, and mixtures thereof.

In this invention, no special limitations are placed on the amount of the organoaluminum compound to be used, but usually it may be employed in an amount of 0.1 to 1000 moles per mole of the transition metal compound.

In the process of this invention, moreover, by contacting the foregoing catalyst system with ethylene and/or an α-olefin and thereafter using it in the vapor phase polymerization reaction, the polymerization activity can be improved to a large extent and the operation can be performed more stably than in the case where such pre-treatment is not applied. And as the α-olefin used in such pre-treatment there may be employed various α-olefins, preferably those of C$_3$ to C$_{12}$ and more preferably those of C$_3$ to C$_8$. Examples are propylene, butene-1, pentene-1,4-methylpentene-1, heptene-1, octene-1, and mixture thereof. The temperature and duration of the contact between the catalyst of this invention and ethylene and/or an α-olefin can be chosen over a wide range; for example, the contact treatment may be performed for 1 minute to 24 hours at 0° to 200° C., preferably 0° to 110° C. The amount of ethylene and/or the α-olefin to be contacted can also be chosen over a wide range, but usually it is desirable that the catalyst of this invention be treated with 1 g to 50,000 g, preferably 5 g to 30,000 g, per gram of the foregoing solid substance of ethylene and/or α-olefin to allow 1 g to 500 g, preferably 1 g to 100 g of ethylene and/or the α-olefin to be reacted per gram of the solid substance. The said contact treatment may be done at any desired pressure, but preferably −1 to 100 kg/cm$^2$.G.

The aforesaid pre-treatment with ethylene and/or an α-olefin may be carried out by first combining the total amount of the organoaluminum compound to be used with the foregoing solid substance and then contacting with ethylene and/or the α-olefin, or alternatively, by first combining part of the organoaluminum compound with the solid substance and then contacting with ethylene and/or gaseous α-olefin and adding the remaining organoaluminum compound separately in the vapor phase polymerization. During the contact between the catalyst and ethylene and/or an α-olefin there may be present hydrogen gas or other inert gas such as nitrogen, argon or helium.

In this invention there is conducted copolymerization of ethylene with an α-olefin in the presence of a catalyst comprising a solid substance and an organoaluminum compound, which solid substance contains a magnesium-containing inorganic solid carrier and a titanium compound and/or a vanadium compound.

As the α-olefin to be used in the copolymerization reaction, those of C$_3$ to C$_8$ are preferred, for example, propylene, butene-1, hexene-1,4-methylpentene-1, and octene-1. These α-olefins should be used in amounts ranging from 4 to 250 mole%, preferably from 5 to 100 mole%, based on the amount of ethylene.

The polymerization reaction is carried out in a substantially solvent-free vapor phase condition. As the reactor to be used, there may be employed known ones such as fluidized bed and agitation vessel.

The temperature of the polymerization reaction is in the range of from 0° to 110° C., preferably from 20° to 80° C., and the pressure thereof in the range of from atmospheric pressure to 70 kg/cm$^2$.G, preferably from 2 to 60 kg/cm$^2$.G. The molecular weight can be adjusted by changing the polymerization temperature, the molar ratio of catalyst or the amount of comonomer, but the addition of hydrogen into the polymerization system is more effective for this purpose. It goes without saying that using the process of this invention there can be conducted without any trouble two or more stage polymerization reactions involving different polymerization conditions such as different hydrogen and comonomer concentrations and different polymerization temperatures.

The ethylene polymer having a melt index of 0.01 to 0.2, a flow parameter of 1.9 to 2.8 and a density not lower than 0.940 used as the other component of the composition of this invention is prepared in known manner usually by the use of a Ziegler, Phillips or Standard type catalyst.

The "flow parameter" as referred to herein indicates a logarithmic value of the ratio of an effluent amount when loaded 21.6 kg to an effluent amount when loaded 2.16 kg according to the method of determining melt index as defined by JIS K-6760, and is defined as follows:

Flow parameter =

$$\log \frac{\text{Effluent amount under 21.6kg load/10 min.}}{\text{Effluent amount under 2.16kg load/10 min.}}$$

Furthermore, the ethylene polymer used as component (2) in the composition of this invention means an ethylene homopolymer, an ethylene/$\alpha$-olefin copolymer, or a mixture thereof.

Working examples of this invention are given below, but it is to be understood that these examples are for illustration only to work the invention and are not intended to restrict the invention.

The "dart strength" and "tear strength" which will appear in the following working and comparative examples indicate values determined by methods conforming to ASTM D1709-62T and ASTM D1922-61T, respectively.

EXAMPLE 1

1000 g. of anhydrous magnesium chloride, 50 g. of 1,2-dichloroethane and 170 g. of titanium tetrachloride were subjected to ball milling for 16 hours at room temperature in a nitrogen atmosphere to allow the titanium compound to be supported on the carrier. The resulting solid substance contained 35 mg. of titanium per gram thereof.

As an apparatus for the vapor phase polymerization there was used a stainless steel autoclave, and with a blower, a flow rate adjusting valve and a dry cyclone for separating the resulting polymer being provided to form a loop. Temperature control for the autoclave was effected by passing warm water through the jacket.

The polymerization temperature was set at 60° C., and the above solid substance and triethylaluminum were charged into the autoclave at the rates of 250 mg/hr and 50 mmol/hr, respectively, and there was made polymerization while adjusting the composition (mole ratio) of the gases fed to the autoclave with the blower so that ethylene was 71% and butene-1 29%.

The resulting ethylene/butene-1 copolymer had an intrinsic viscosity of 3.5 dl/g measured in decalin at 135° C., a bulk density of 0.39 and a density of 0.897.

20 parts by weight of the ethylene/butene-1 copolymer prepared above was thoroughly mixed with 80 parts by weight of an ethylene polymer having a melt index of 0.07, a flow parameter of 2.01 and a density of 0.945, then the resulting mixture was pelletized at 200° C. using an extruder 50 mm in inside diameter having a L/D ratio of screw of 26.

Then, the pellets were melt-extruded through a spiral annular die with a die-lip gap of 1.0 mm and a die-lip outside diameter of 50 mm attached to the extruder, and a film having a wall thickness of 30$\mu$ was formed by air-cooled inflation. The film forming conditions were as follows: die temperature 220° C., expansion ratio 3.1, tubular film withdrawing speed 35 m/min. The dart strength of the so-formed film was 310 g. and the tear strength thereof was 15 kg/cm$^2$ in the longitudinal direction, 300 kg/cm$^2$ in the transverse direction. Thus there was obtained a film having an extremely high impact strength and a high tear strength.

COMPARATIVE EXAMPLE 1

A film was formed under the same conditions as in Example 1 except that only the ethylene polymer used in Example 1 having a melt index of 0.07, a flow parameter of 2.01 and a density of 0.945 was used without using the ethylene/butene-1 copolymer. The dart strength of the film was 220 g. and the tear strength thereof was 8 kg/cm$^2$ in the longitudinal direction, 210 kg/cm$^2$ in the transverse direction.

EXAMPLE 2

Using 10 parts by weight of an ethylene/butene-1 copolymer having an intrinsic viscosity of 2.1 dl/g determined in decalin at 135° C. and a density of 0.904 prepared in the same way as in Example 1 and 90 parts by weight of an ethylene polymer having a melt index of 0.07, a density of 0.945 and a flow parameter of 2.01, there was prepared a mixed composition in the same manner as in Example 1, which was then formed into a film with a wall thickness of 30$\mu$.

The dart strength of the film was 280 g. and the tear strength thereof was 13 kg/cm$^2$ in the longitudinal direction, 330 kg/cm$^2$ in the transverse direction. Thus there was obtained a film having remarkably high impact strength and tear strength.

EXAMPLE 3

Using 10 parts by weight of an ethylene/propylene copolymer having an intrinsic viscosity of 2.2 dl/g determined in decalin at 135° C. and a density of 0.870 prepared in the same way as in Example 1 and 90 parts by weight of an ethylene polymer having a melt index of 0.07, a density of 0.945 and a flow parameter of 2.01, there was prepared a mixed composition in the same manner as in Example 1, which was then formed into a film with a wall thickness of 30$\mu$.

The dart strength of the film was 290 g. and the tear strength thereof was 14 kg/cm$^2$ in the longitudinal direction, 280 kg/cm$^2$ in the transverse direction. Thus there was obtained a film having remarkably high impact strength and tear strength.

We claim:

1. A polymer composition for forming polyethylene film comprising an ethylene/$C_3$–$C_8\alpha$-olefin copolymer, said copolymer having been prepared by copolymerizing ethylene and a $C_3$–$C_8\alpha$-olefin in a substantially solvent free vapor phase condition and in the presence of a catalyst which is an organoaluminum compound and a solid substance, said solid substance being a magnesium containing inorganic solid carrier and at least one member selected from the group consisting of a titanium compound and a vanadium compound; said copolymer being further characterized as having an intrinsic viscosity of 1.3 to 8.7 dl/g determined in decalin at 135° C. and a density of 0.850 to 0.904; said copolymer being mixed with an ethylene polymer having a melt index of 0.01 to 0.2, a flow parameter of 1.9 to 2.8 and a density of at least 0.940, the weight percent ratio of said copolymer to said polymer being from 0.1 to 40:99.9 to 60.

2. The composition as defined in claim 1, in which the mixing ratio (weight percent) of said copolymer (1) and said ethylene polymer (2) is (1):(2)=1 to 30:99 to 70.

3. A film comprising an ethylene/$C_3$-$C_8$ α-olefin copolymer having an intrinsic viscosity of 1.3 to 8.7 dl/g determined in decalin at 135° C. and a density of 0.850 to 0.904 and an ethylene polymer having a melt index of 0.01 to 0.2, a flow parameter of 1.9 to 2.8 and a density of at least 0.940 the weight percent ratio of said copolymer to polymer being from 0.1 to 40:99.9 to 60.

4. The film as defined in claim 3, in which said copolymer is a copolymer prepared by copolymerizing ethylene and an α-olefin of $C_3$ to $C_8$ in a substantially solvent-free vapor phase condition and in the presence of a catalyst, said catalyst comprising a solid substance and an organoaluminum compound, which solid substance contains a magnesium-containing inorganic solid carrier and at least one member selected from the group consisting of a titanium compound and a vanadium compound.

* * * * *